(12) United States Patent
Neal

(10) Patent No.: US 6,419,246 B1
(45) Date of Patent: Jul. 16, 2002

(54) BUCKET DOLLY

(76) Inventor: Thomas G. Neal, 4061 Hatcher Hollow Rd., Walland, TN (US) 37886

( * ) Notice: Subject to any disclaimer, the term of this patent is extended or adjusted under 35 U.S.C. 154(b) by 0 days.

(21) Appl. No.: 09/571,391

(22) Filed: May 15, 2000

Related U.S. Application Data

(60) Provisional application No. 60/140,809, filed on Jun. 28, 1999.

(51) Int. Cl.$^7$ ................................................ B62B 3/00
(52) U.S. Cl. ................................. 280/79.5; 280/47.34
(58) Field of Search ............................ 280/79.5, 79.11, 280/47.34, 47.35, 47.36, 47.371; 16/47, 18 CG

(56) References Cited

U.S. PATENT DOCUMENTS

| | | | |
|---|---|---|---|
| 1,013,605 A | | 1/1912 | Lyon |
| 1,321,713 A | * | 11/1919 | Buie ..................... 280/47.371 |
| 2,531,131 A | | 11/1950 | Johnson |
| 3,399,903 A | * | 9/1968 | Bailey ..................... 280/47.34 |
| 3,554,573 A | * | 1/1971 | Miller ....................... 280/79.5 |
| 3,734,527 A | | 5/1973 | Bard |
| 3,802,717 A | * | 4/1974 | Eitreim ..................... 280/79.11 |
| 3,873,119 A | * | 3/1975 | Koch ....................... 280/79.11 |
| 4,457,045 A | * | 7/1984 | Kegg ............................. 16/47 |
| 4,861,050 A | * | 8/1989 | Bergeron ................... 280/79.5 |
| D313,342 S | * | 1/1991 | Screen .......................... 16/47 |
| 5,088,751 A | | 2/1992 | Zint |
| 5,119,525 A | * | 6/1992 | Melara .......................... 16/47 |
| 5,371,921 A | * | 12/1994 | Roe .............................. 16/47 |
| 5,472,220 A | * | 12/1995 | Stephan ..................... 280/79.5 |
| 5,806,867 A | | 9/1998 | Hampton |
| 6,027,128 A | | 2/2000 | Stich et al. |
| 6,053,516 A | * | 4/2000 | Ottaway ..................... 280/79.5 |

* cited by examiner

*Primary Examiner*—J. J. Swann
*Assistant Examiner*—Christopher Bottorff
(74) *Attorney, Agent, or Firm*—Michael E. McKee

(57) ABSTRACT

A dolly facilitating the transport of a cylindrical bucket or can between two sites includes a wheeled base comprising a frame having a plurality of elongated members which are joined together in a planar, spoke-like arrangement so that the end portions of the members are directed generally outwardly of a center and a plurality of double-wheeled casters which are pivotally attached to the ends of the members for supporting the spoke-like arrangement of the frame in a substantially horizontal orientation for wheeled movement across a supporting surface. A retaining ring is supportedly attached upon the spoke-like arrangement for accepting a bucket inserted bottom-end first therein and for preventing a lateral shifting of the bucket across the frame. In addition, an elongated handle is attached to the frame so that an upper end extends generally upwardly from the frame in a substantially vertically condition and so that the handle is maintained in. the substantially vertical condition. The casters are constructed so that the inner bearings of the casters are protected from paint or other substance dropped upon the casters, and for purposes of aiding a painter in his tasks, the handle is adapted to support an extension handle for a paint roller leaned thereagainst and further includes a hook assembly which is adapted to hold a cutting pot at a good working height for a painter.

18 Claims, 4 Drawing Sheets

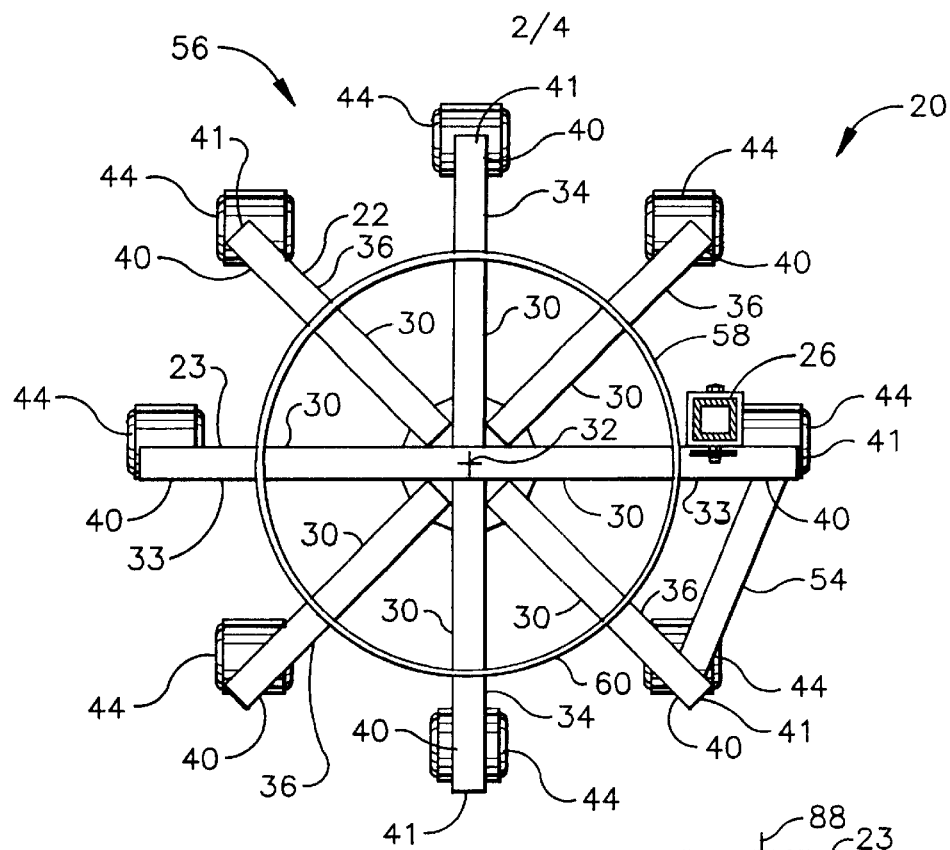
*Fig. 3*
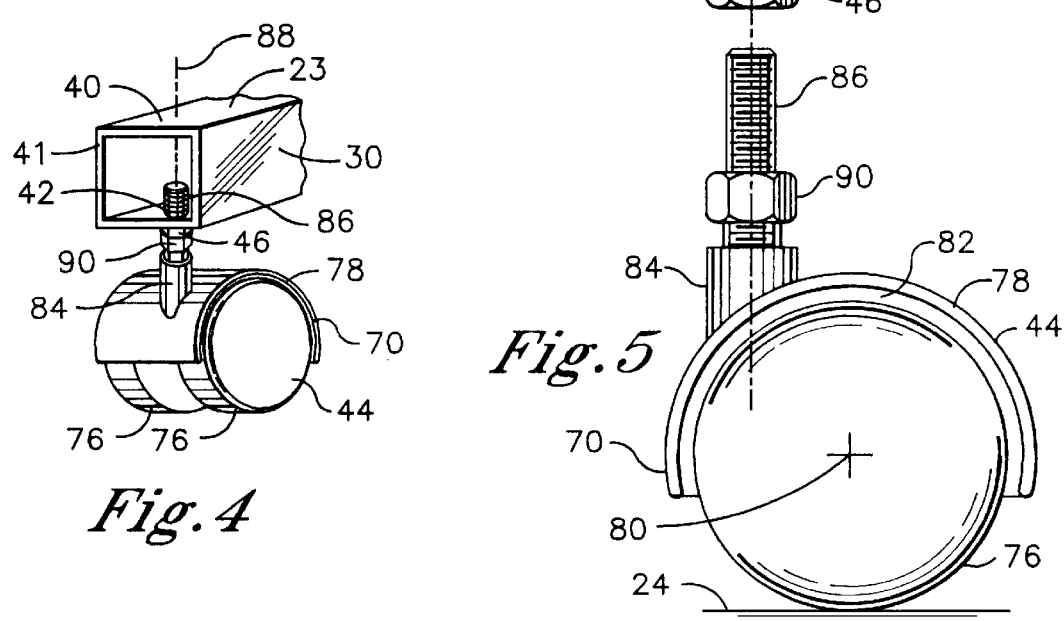
*Fig. 4*     *Fig. 5*

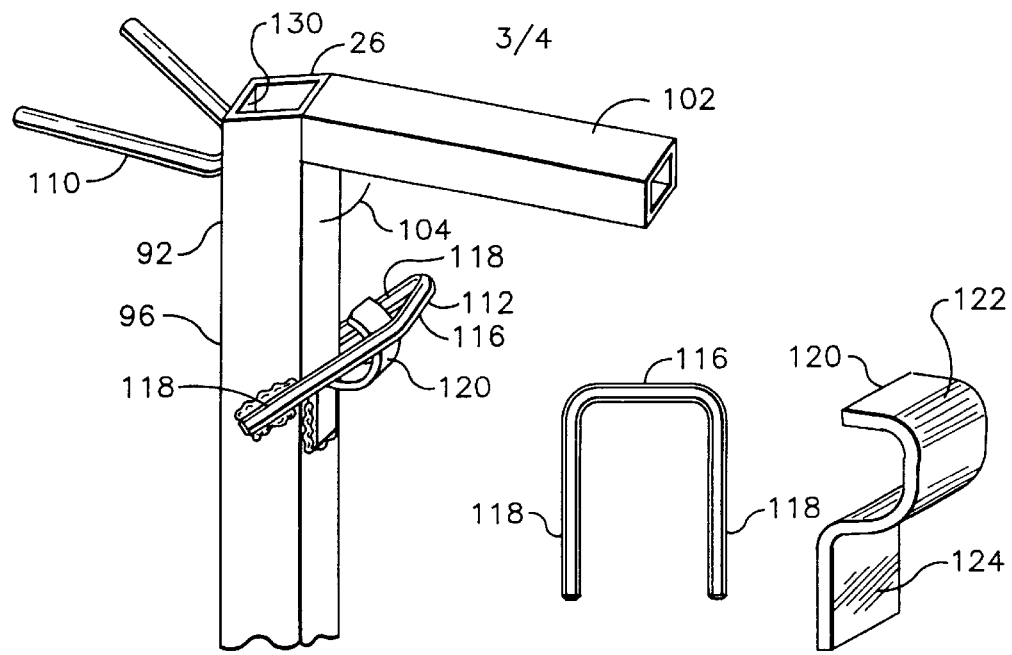
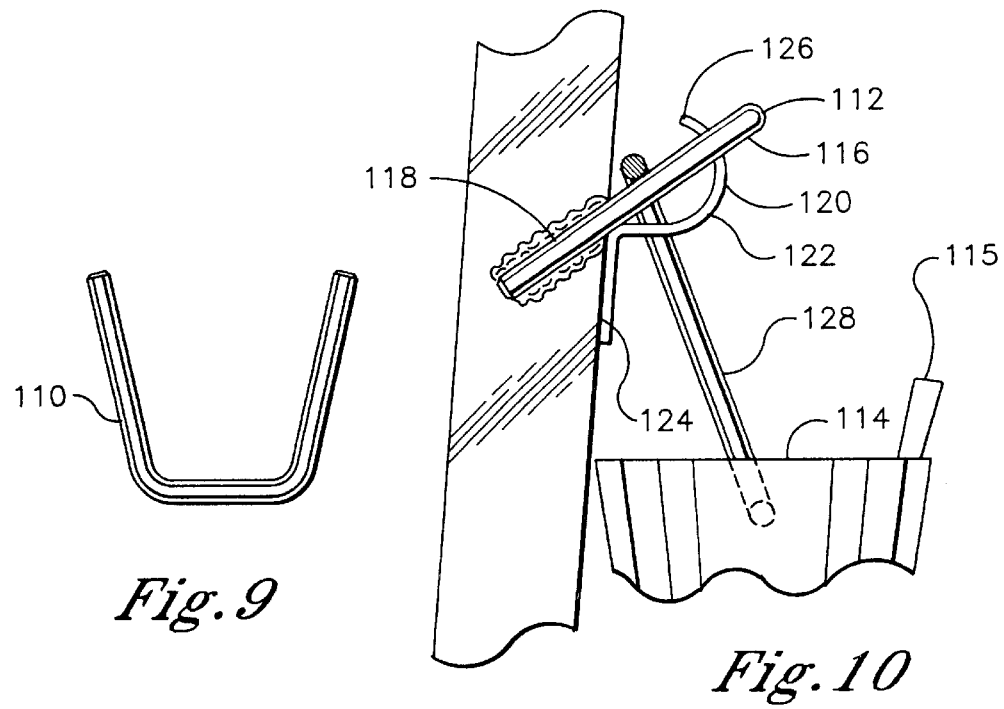

BUCKET DOLLY

The benefit of Provisional Application Ser. No. 60/140,809, filed Jun. 28, 1999 and entitled THE BUCKET BUDDY, is hereby claimed. The disclosure of this referenced provisional application is incorporated herein by reference.

BACKGROUND OF THE INVENTION

This invention relates generally to wheeled accessories which facilitate the transport of a bucket or can from one site to another site and relates, more particularly, to such a wheeled accessory which is particularly well-suited as an aid for helping painters and similar laborers in their tasks.

Dollies which are capable of supporting the weight of a large bucket or container, such as a five-gallon paint can, and which permit the bucket to be wheeled from one site to another site are known. Such dollies commonly include a wheeled base upon the bucket is positionable and, in some cases, also include a handle which enables the base to be pushed or pulled between alternative sites. Examples of such dollies, not all of which include handles, are described in U.S. Pat. Nos. 5,806,867, 5,472,220, 1,013,605 and 6,027,128.

It is an object of the present invention to provide a new and improved dolly which facilitates the transport of a bucket from one site to another site.

Another object of the present invention is to provide such a dolly which is particularly. well-suited for use by painters for transporting a paint-filled bucket between alternative sites for use of the paint contained within the bucket.

Still another object of the present invention is to provide such a dolly whose construction and components contribute-to the working life of the dolly.

Yet another object of the present invention is to provide such a dolly having wheels whose construction protects the internal bearing of the wheels and thereby contributes to the working life of the wheels.

A further object of the present invention is to provide such a dolly having a handle which is capable of holding a secondary container, such as a painter's cutting pot, as well as facilitates the movement of the dolly from one site to another site.

A still further object of the present invention is to provide such a dolly which is uncomplicated in construction and effective in operation.

SUMMARY OF THE INVENTION

This invention resides in a dolly which facilitates the transport of a bucket between two sites.

The dolly includes a wheeled base including a plurality of wheel assemblies and a frame having a plurality of elongated members which are joined together in a spoke-like arrangement so that end portions of the elongated members are directed generally outwardly from a center. The wheel assemblies are attached to the elongated members adjacent the end portions thereof for supporting the spoke-like arrangement of the frame in a substantially horizontally-disposed orientation for wheeled movement of the frame across a supporting surface. Means are attached to the frame providing a retaining ring for accepting a bucket inserted bottom-end first therein and for preventing an appreciable shift of the bucket laterally of the frame when the bucket is positioned within the retaining ring. The dolly also includes an elongated handle having two opposite ends, wherein one end of the handle is attached to the frame adjacent one side thereof so that the other end of the handle extends generally upwardly therefrom in a substantially vertical condition. Furthermore, each wheel assembly includes a wheel and internal bearings by which the wheel rotates relative to the remainder of the wheel assembly and further includes a cover which covers the internal bearings of the wheel assembly to protect the internal bearings from paint or other substance dropped upon the wheel assembly.

BRIEF DESCRIPTION OF THE DRAWINGS

FIG. 3 is a top plan view of the FIG. 1 embodiment as seen generally along line 3—3 of FIG. 1.

FIG. 4 is a perspective view of one of the wheel assemblies of the FIG. 1 embodiment.

FIG. 5 is a side elevational view of one of the wheel assemblies of the FIG. 1 embodiment, but drawn to a slightly larger scale than that shown in FIG. 4 and shown being removed from the frame of the FIG. 1 embodiment.

FIG. 6, is a perspective view of a fragment of the upper end of the handle of the FIG. 1 embodiment.

FIG. 7 is a plan view of one U-shaped component of the fragment illustrated in FIG. 6.

FIG. 8 is a perspective view of a hook-shaped component of the fragment illustrated in FIG. 6 but drawn to a slightly larger scale.

FIG. 9 is another U-shaped component of the fragment illustrated in FIG. 6.

FIG. 10 is a side elevational view, shown partly in section, of another fragment of the upper end of the handle of the FIG. 1 dolly and. wherein a painter's cutting pot is shown supported by the handle.

DETAILED DESCRIPTION OF AN ILLUSTRATIVE EMBODIMENT

Figure 1:
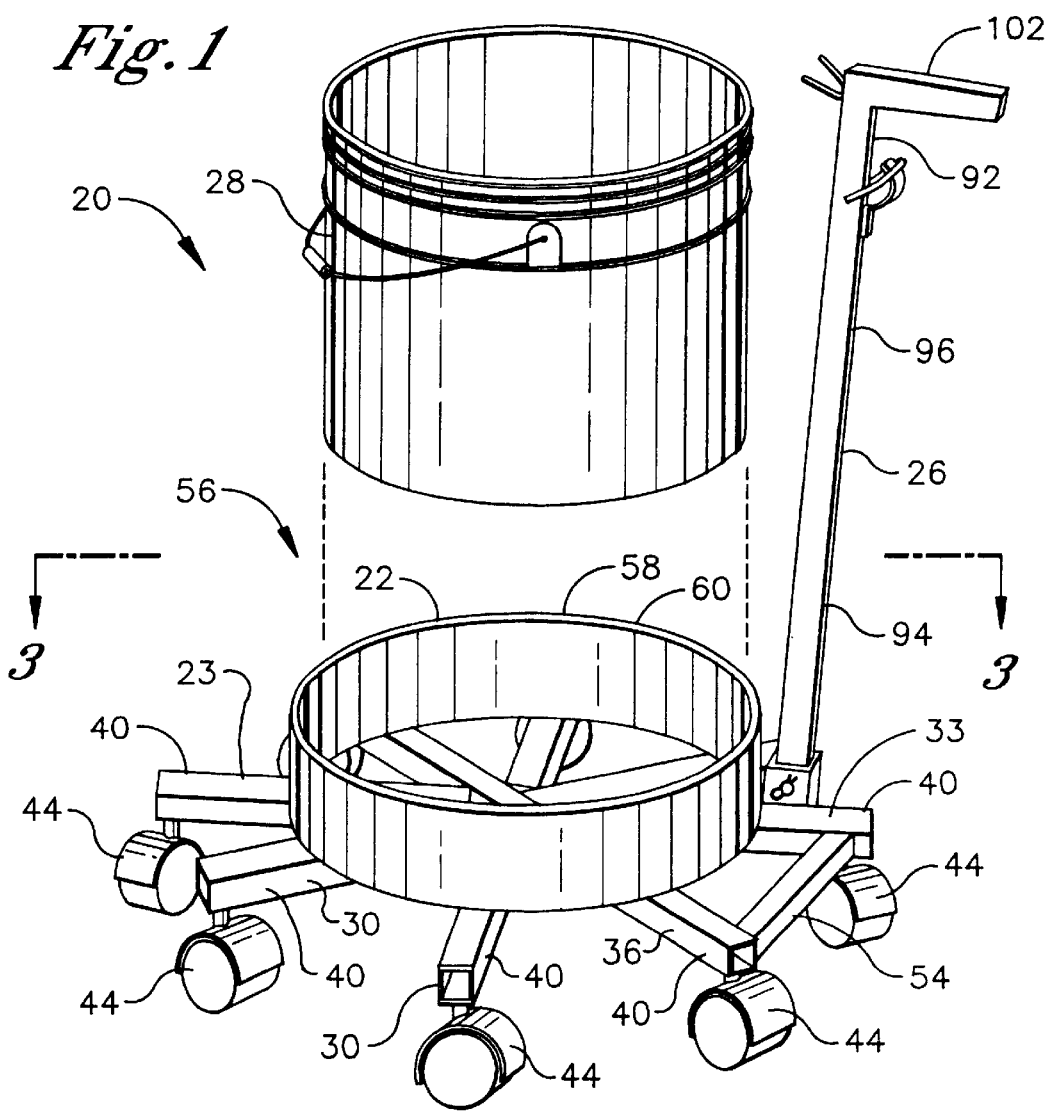
FIG. 1 is a perspective view of an embodiment of a dolly within which features of the present invention are embodied and a bucket which is capable of being positioned within and transported by the dolly.
Figure 2:
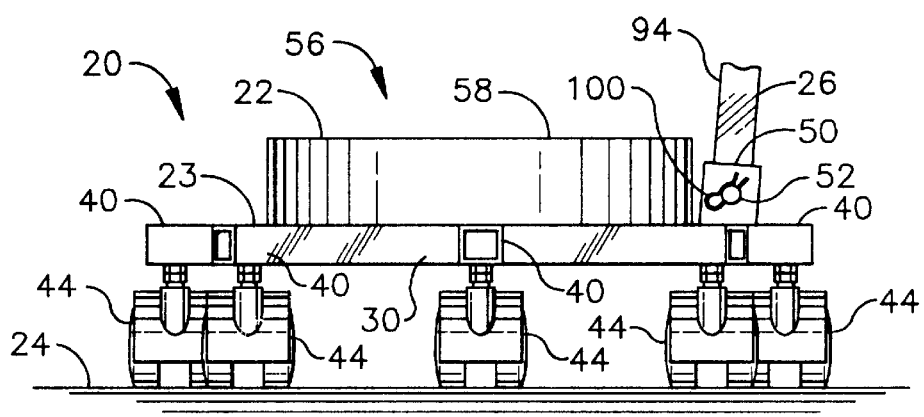
FIG. 2 is a side elevational view of a fragment of the FIG. 1 embodiment.

Turning now to the drawings in greater detail, there is illustrated in FIGS. 1–3 an embodiment, generally indicated 20, of a dolly within which features of the invention are incorporated. The dolly 20 includes a wheeled base 22 positioned upon a floor or similar support surface 24 (FIG. 2). and a handle 26 which is attached to the base 22 for facilitating the movement of. the base 22 across the support surface 24. In an environment of intended use, a relatively large bucket 28 (e.g. a five-gallon can) of a material, such as paint or dry wall joint compound, is positioned upon the base 22 to facilitate the wheeled movement of the bucket 28 between two alternative sites.

The base 22 includes a plurality of (i.e. eight) wheel assemblies 44 and a frame 23 to which the wheel assemblies 44. are attached. In the depicted dolly 20, the base 22 includes a frame 23 comprised of a plurality of rigid elongated members 30 which are joined (e.g. welded) together in a planar, spoke-like arrangement so that end portions, indicated 40, of the members 30 extend radially outwardly from a center 32 (FIG. 3) of the frame 23. In the depicted dolly 20 and as best shown in FIG. 3, the elongated members 30 include a single (long) member 33 and a pair of shorter members 34 which are joined (e.g. welded) together in a cross-like shape and four short members 36 which are positioned (and joined) within the frame 23 so that one short member 36 is disposed between a corresponding pair of legs of the cross-like shape formed by the members 33 and 34. Each portion 40 of the elongated members 33, 34 and 36 terminate at an end 41 which is arranged in a horizontally-arranged circle (having a center 32) with the other ends 41.

To facilitate the attachment of the wheel assemblies 44 to the base 22 in a manner described herein and with reference to FIGS. 4 and 5, each end portion 40 is provided with a vertically-disposed opening 42 on the underside thereof, and an internally-threaded nut 46 is fixedly secured, i.e. welded, to the lower surface of the end portion 40 so that the interhally-threaded opening of the nut 46 is aligned with the vertically-disposed opening 42 of the end portion 40.

In addition and with reference again to FIGS. 3 and 4, there is attached to the single (long) member 33 a sleeve member 48 which is disposed adjacent one of the end portions 40 of the member 33. The sleeve member 48 is arranged in such a relation to the remainder of the frame 23 so that the through-opening, indicated 50 in FIG. 2, of the sleeve member 48 is oriented substantially vertically. As will be apparent herein, the sleeve member 4.8 accepts the lower end of the handle 26 when inserted endwise therein, and a pin 52 (FIG. 2) is inserted through aligned openings provided in the sleeve member 48 and handle 26 to secure the handle 26 to the frame 23.

Further still, the frame 23 of the depicted dolly 20 includes a brace member 54 which is joined between adjacent end portions 40 of the single (long) member 33 and a short member 36, as best seen in FIGS. 1 and 3. This brace member 54 is disposed on the same side of the frame 23 as the handle 26 and helps a user of the dolly 20 to manipulate the dolly 20 to a higher level, such as may be necessary to maneuver the dolly 20 over a step or curb. More specifically, by placing a foot upon the brace member 54 to prevent it from moving from its position by an appreciable amount-and then pulling back upon the upper end of the handle 26 (as the handle 26 is used as a lever), the opposite side of the frame 23 is lifted off of the support surface 24 by several inches. Therefore, when the dolly 20 is rolled to step or curb, a foot can be placed upon the brace member 54 (to brace the frame 23) and the handle 26 can be operated as a lever to raise the other side of the frame 23 to the elevated height of the step or curb so that the frame 23 can be readily manipulated over the step or curb. Further still, this brace member 54 provides a handle with which the base 22 can be manually carried -when the handle 26 is detached from the base 22.

Within the depicted dolly 20, the elongated members 30 of the frame 23, the sleeve member 48 and the brace member 54 are constructed of steel tubing which is square in cross section. Hence, these components of the frame 23 can be readily joined to one another with welds, although other means, such as bolts, can be used. By way of example, and not as limitation, the tubing used in the construction of the frame 23 and handle 26, described herein, is one-inch (square) by fourteen gauge steel tubing.

With reference again to FIGS. 1–3, the frame 23 also includes means, generally indicated 56, providing a retaining ring 58 for accepting and retaining a bucket 28 inserted bottom-end first within the ring 58 so that the bucket 28 rests directly upon the spoke-like arrangement of members 30 of the frame 23. Within the depicted dolly 20, the retaining ring 58 is provided by a relatively thin sheet of steel (e.g. sixteen gauge) which has been formed into a ring 60 and welded along a seam 62. In addition, the ring 58 has been welded atop the spoke-like arrangement of elongated members 30 so that the center (vertical) axis of the ring 58 overlies the center 32 (FIG. 3) of the spoke-like arrangement of members 30. Furthermore, the ring 58 is sized to closely accept the bottom of a standard-sized five gallon bucket 28 so that when positioned within the ring 58 the bucket 58 cannot slide or shift by an appreciable extent laterally across the frame 23.

It follows that with the ring 58 attached atop the spoke-like arrangement of members 30, the spoke-like arrangement of members 30 provides the base upon which the bucket 28 rests when placed within the ring 58, while the ring 58 acts as a retaining wall for preventing the bucket 28 from shifting from side-to-side by an appreciable extent. In addition and since the spoke-like arrangement of members 30 does not provide a surface which will hold fluids (by virtue of the spacings provided between the members 30), water, e.g. rainwater, cannot collect upon the frame 23 and within the ring 28. Therefore, the open-bottom nature of the retaining ring 28 is less likely to rust or degrade due to water which could otherwise accumulate within the ring 28.

With reference again to FIGS. 4 and 5, each wheel assembly 44 of the depicted dolly 20 includes a double-wheeled caster 45 which is suitably attached to a corresponding end portion 40 of the members of the spoke-like arrangement of the frame 23 so that the frame 23 can be wheeled across the support surface 24 from one site to another site. Each caster 45 of a wheel assembly 44 includes a body 70 having a horizontal opening through which a shaft is fitted and a pair of wheels 76 which are secured about the opposite ends of the shaft. The wheel 76 of each assembly 44 is provided with a set of internal bearings so that when secured about the shaft, each wheel. 76 can be rotated about the shaft independently of the other wheel 76 with a relatively small amount of frictional resistance.

Another feature of each caster 45 relates to the provision of a hood, or cover 78, which is attached to the caster body 70 so as to cover the upper surfaces of the wheels 76, as shown in FIG. 5, and thereby protect the internal bearings of the wheels 76. In this connection, each cover 78 has an arcuate shape (as seen from the side view of FIG. 5) and a width which is wide enough to cover the upper surfaces of both wheels 76 of the caster 45 and to extend along the periphery of the wheels 76 from the uppermost point thereof to a position which is no higher than (as viewed in FIG.5) the rotational axis, indicated 80, of the wheels 76. For attachment of the cover 78 to the caster body 70, the body 70 also includes a portion 82 which protrudes upwardly from the rotational axis 80, and the underside of the cover 78 is secured atop this, upwardly-protruding portion 82.

For attachment of the casters 45 to the frame 23 of the base 22, each caster 45 includes a hollow, elongated cylindrical portion 84 attached atop the cover 78 at a location thereon which is offset from the vertical centerline of the upwardly-protruding portion 82, and a threaded shaft 86 is journaled within the cylindrical portion 84 so as to extend upwardly therefrom. To this end, a bearing is suitably secured within the cylindrical portion 84, and the shaft 86 is fitted within the bearing so that the body 70 of each caster 45 is free to rotate about an axis 88 coincident with the vertical centerline of the cylindrical portion 84 with relatively little frictional resistance. In addition, an internally-threaded nut 90 is threaded about the shaft 86 for a reason which will be apparent herein.

To attach each wheel assembly 44 to the frame 23, the shaft 86 of the assembly 44 is threaded into the nut 46 so that the upper end of the shaft 86 extends upwardly through the through-opening 42 of the end portion 40. The nut 90 is thereafter tightened (as a jam nut) against the lower surface of the nut 46 so that the shaft 86 is rigidly secured to the corresponding end portion 40. It follows that the wheel assemblies 44 can be readily removed from the frame 23 by loosening the (jam) nut 90 and unscrewing the shaft 86 from the nut 90.

With the shaft 86 of each caster 45 secured to a corresponding end portion 40 of the spoke-like arrangement of. the frame 23 in the aforedescribed manner, the casters 45 are suitably attached to the frame 23 of the dolly 20 so that movement of the dolly 20 in one direction across the support surface 24 effects the pivotal movement, as necessary, of the bodies 70 of the casters 45 about the rotation axis 88 so that the wheels 88 are aligned with the direction of movement of the dolly 20 across the support surface 24. With the wheels 76 thereafter aligned with the direction of movement of the dolly 20, the wheels 76 are permitted to rotate about the rotational axis 80 in accordance with the movement of the dolly 20 across the support surface 24. Thus, the casters 45 act as common casters capable of changing directions, as necessary, to align its wheels 76 with the direction of movement of the dolly 20 across the support surface 24.

The casters 45 are advantageous in that the covers 78 thereof suitably protect the inner bearings of the wheels 76 from paint or other substance (e.g. drywall joint compound) which may be dropped upon the casters 45 from above. In other words, the extension of the covers 78 downwardly along the upper surfaces of the wheels 76 to a location which is no higher than the (horizontal) level of the rotational axis 80 of the wheel prevents the exposure of the inner bearings of the wheels 76 to paint or other substance which could be inadvertently spilled or dropped from the bucket 28. This advantage can be readily appreciated in view of the fact that wheeled dollies of the prior art commonly utilize wheels whose bearings are not as adequately protected from spilled paint or other substances dropped thereon from above, and. such spilled substances are likely to lead to the locking up, and thus a failure of, the wheels. In contrast, however, and since the inner bearings of the wheel assemblies 44 of the depicted dolly 20 are protected by the covers. 78, the working life of the wheel assemblies 44 are believed to be prolonged by the covers 78. Double-wheeled casters which are comparable to the casters 45 described above are available from Faultless Caster of Evansville, Indiana under the trade designation Nylon Hooded Twin Wheeled Casters.

Another feature of the depicted dolly 20 relates to the relatively large spacing of the wheel assemblies 44 from the center.32 (FIG. 3) of the frame 23 so that the wheel assemblies 44 are disposed outboard of the retaining ring 58. By spacing the wheel assemblies 44 outward of the retaining ring 58 (e.g. at least about 2.5 inches as measured from the retaining ring 58 and the caster pivot axis 88 or at least about 8.0 inches from the center 32 of the spoke-like arrangement of the frame 23), the stability of the dolly 20 is enhanced.

With reference to FIGS. 1, 2, 6 and 10–11, the handle 26 of the dolly 20. is elongated in shape and includes two Opposite upper and lower ends 92 and 94, respectively. It is a feature of the depicted dolly 20 that the handle 26 is attached to the frame 23 so that the handle 26 is maintained in a stationary relationship with respect to the base 22 in an upright, or substantially vertical, condition. In this connection, the handle 26 includes a lengthy linear section 96 of steel tubing (which is square in cross section) having one end 94, i.e. its lower end, which is received by the square through-opening 50 (FIG. 2) of the sleeve member 48. With the lower end 94 of the section 96 received by the sleeve member 48, the pin 52 is inserted through horizontally-aligned openings formed in the lower end 94 and sleeve member 48.to secure the lower end 94 to the frame 23 and thereby secure the handle 26 to the base 22. Preferably, a cotter key 100 is secured to one end of the pin 52 to prevent the pin 52 from being withdrawn from the aligned through-openings provided in the lower end 94 and sleeve member 48.

As best shown in FIGS. 1 and 6, the handle 26 also includes a short section 102 of square steel tubing which is fixedly attached, i.e. welded, at the upper end 92 of the lengthy tubing section 96 to form an acute angle 104 (FIG. 6) therewith. This short section 102 of tubing provides a grip which can be grasped by a user for purposes of pushing or pulling the, dolly 20 between alternative sites and is advantageous in this respect, and the-upwardly-directed opening, indicated 130 in FIG. 6, provided at the top of the handle 26 has been found to be well-suited for holding a caulking gun having a rod-like component which can be accepted by, and thereby held from, the opening 130.

Additional features, described herein, embodied within the handle 26 renders the dolly 20 particularly well-suited for use as an aid to a painter who has positioned a large bucket 28 of paint Within the retaining ring 58 of the base 22 and thereafter places a paint roller 106 (FIG. 11), with an extension 108 (i.e. a rolling pole) attached thereto, within the bucket 28 for use. One such feature relates to the provision of nesting means in the form of a U-shaped steel member 110 (FIGS. 6, 9 and 11) adjacent the upper end 92 of the lengthy section 96 of the handle 26 wherein the U of its U-shape is large enough to accept the shank of the extension 108 positioned sideways wherein. In the depict ed embodiment 20, the U-shaped member 48, is made from a steel rod which is bent to form the U-shape and is welded to the upper end 92 of the lengthy section 96 of the handle 26 (and on the side thereof opposite the short section 102 of tubing) so that the legs of its U-shape extend toward the vertical centerline of the frame 23. With the U-shaped member 110 attached to the lengthy section 96 of the handle 26 in this manner, a paint roller 106 (having an extension 108 attached thereto) can be placed roller-end-first into the bucket 28 of paint until it rests within the bucket 28, and the extension 108 can be leaned against the handle 26 so that the extension 108 is nestingly received, or captured, between the legs of the U-shaped member 110. With the extension 108 captured by the U-shaped member 110 in this manner, the extension 108 is prevented from falling to one side or the other side by way of the legs of the U-shape member 110 and is maintained in a relatively upright orientation so that a user, i.e. painter, need not bend over to grasp the extension 108 and roller 106 for use.

With reference again to FIGS. 6–8 and 10, the handle 26 also includes a hook assembly 112 for supporting a tool, such as a small paint-containing bucket 114 (i.e. a secondary bucket) by its handle at a working height (e.g. about waist-level) for a painter. In this connection, it is common for a painter to keep on hand a small paint bucket 114 and a brush 115 for painting areas, such as around door and window facings, which are not easily painted with a paint roller. Such paint buckets 114 are commonly referred to in the art as cutting pots in that they facilitate the "cutting in" of areas required to be painted with a painting tool (e.g. a small brush 115) having a smaller work area than does a roller.

In the depicted dolly 20, the hook assembly 112 includes a U-shaped steel member 116 having legs 118 which are fixedly secured, i.e. welded, to the opposite sides of the lengthy section 96 of the handle 26 so that the legs 118 straddle the lengthy section 96 and the base of the U-shaped member extends upwardly and rearwardly of the lengthy section 96 at about a forty-five degree angle with respect thereto. In addition, the hook assembly 112 includes a steel hook member 120 having an arcuate portion 122 and a base portion 124 which is attached, e.g. welded, to the surface of the lengthy section 96 of the handle 26 opposite the U-shaped member.110 so that the arcuate portion 122 extends upwardly through the U of the U-shaped member 118 so that the upper end, indicated 126 in FIG. 10, of the arcuate portion 122 is disposed between the plane of the U of the U-shaped member 116 and the adjacent surface of the lengthy section 96.

Figure 11:
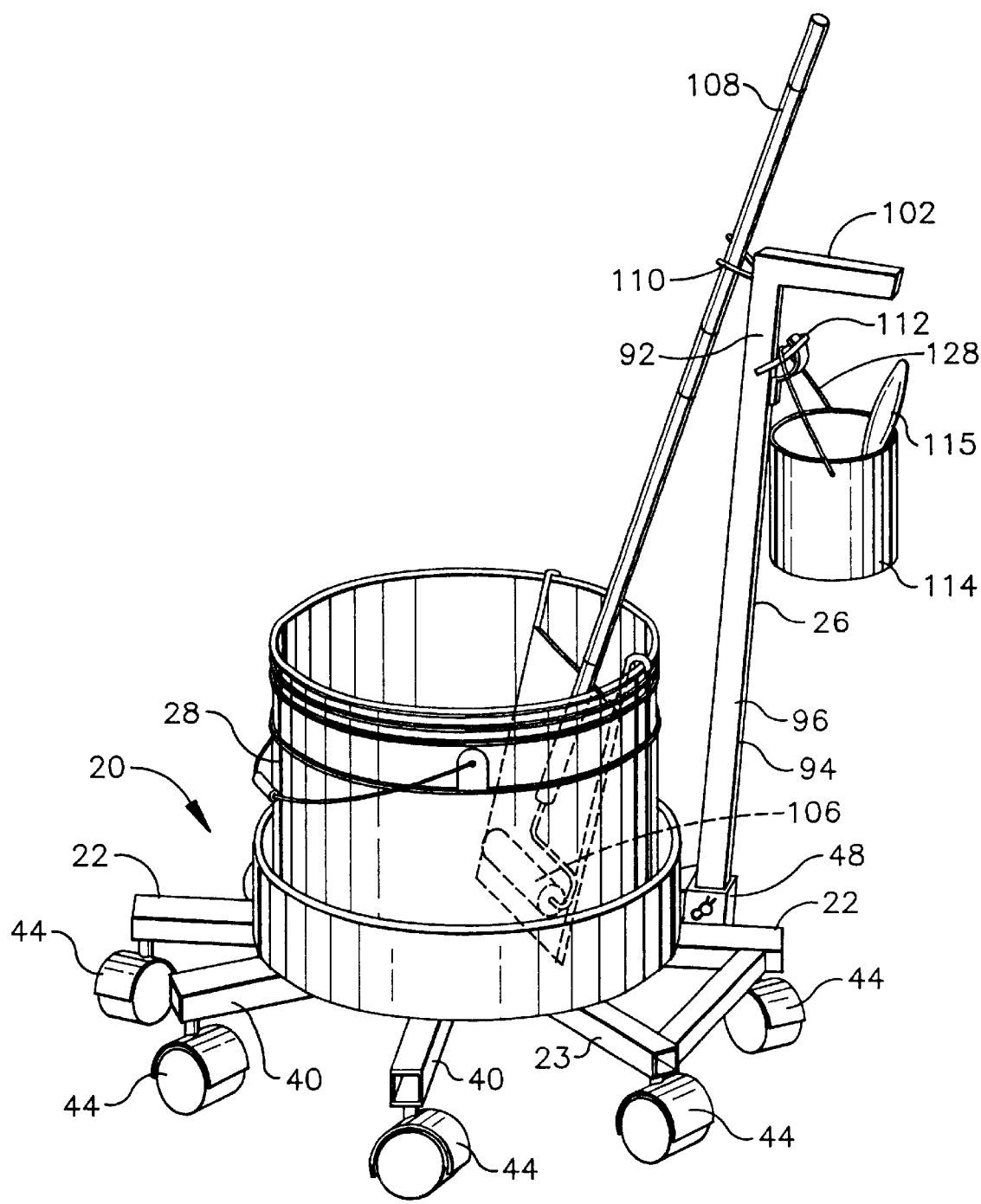
FIG. 11 is a perspective view of the FIG. 1 embodiment, similar to the view shown in FIG. 1, but illustrating a painter's bucket, paint roller and extension, and cutting pot being supported upon the embodiment.

With the upper end 126 of the arcuate portion 122 positioned between the U-shaped member 116 in such a manner, the handle, indicated 128 in FIGS. 10 and 11, which is commonly constructed of wire, of the small bucket, or cutting pot 114, can be hooked over the U-Shaped member 116 and maintained in place thereon by the upper end 126 of the hook member 120. It follows that with the cutting pot handle 128 hooked upon the hook assembly 112 in such a manner, the handle 128 is stably held upon the dolly handle 26 and cannot be easily shaken free or dislodged therefrom.

It follows from the foregoing that a wheeled dolly 20 has been described whose several wheel assemblies 44 are disposed outboard from the center 32 of the frame 23 of the dolly 20 so that a bucket 28, positioned within the retainer ring 58 of the dolly 20 is stably supported upon the dolly 20 and whose wheel assemblies 44 are constructed so that the inner bearings thereof are protected from paint, drywall joint compound or some other substance dropped thereon. In addition, the handle 26 of the dolly 20, because of its vertical disposition and U-shaped member 110, is well-suited as a support for an extension 108 and paint roller 106 leaned theroagainst, and because of its hook assembly 112, is capable of holding a cutting pot 114 for a painter at a convenient working height.

By way of example, the following dimensions of the dolly 20 are provided: the diameter of the spoke-like arrangement of the frame 23 as measured along the length of the single member 33 is about 18 inches, the diameter of the retaining ring 58 is about 11.25 inches, the height of the retaining ring 58 is about 3.0 inches, the distance that the frame 23 is supported above the support surface 24 by the wheel assemblies 44 is about 2.75 inches, the length of the lengthy section 96 of the handle 26 is about 35 inches and the length of the shorter section 102 of the handle 26 is about 5.0 inches.

It will be understood that numerous modifications and substitutions can be had to the aforedescribed embodiment without departing from the spirit of the invention. For example, although the handle 26 has been shown and described as being attached to the frame 23 of the dolly 20 by means of a pin 52 which extends through aligned openings in the sleeve member 48 and lower end 94 of the lengthy section 96 of the handle 26, the handle 26 can be attached to the frame 23 by alternative means. For example, mating sections of a metal hinge can be welded to each of the lower end 94 and one of the frame members 30, and sections of the hinge can be joined with a removable pin. In any event, it is preferable that the handle 26 can be easily detachable from the base 22 to enable the components (i.e. the base 22 and handle 26) to be more easily carried or stored. Accordingly, the embodiment 20 is intended for the purpose of, illustration and not as limitation.

What is claimed is:

1. A dolly facilitating the transport of a bucket between two sites, the dolly comprising:
    a wheeled base including
        a) a frame having a plurality of elongated members which are joined together in a spoke-like arrangement so that end portions of the elongated members are directed generally outwardly from a center,
        b) a plurality of wheel assemblies which are attached to the elongated members adjacent the end portions thereof for supporting the spoke-like arrangement of the frame in a substantially horizontally-disposed orientation for wheeled movement of the frame across a supporting surface, and
        c) means providing a retaining ring which is supportedly attached upon the spoke-like arrangement of the frame for accepting a bucket inserted bottom-end first therein and for preventing an appreciable shift of the bucket laterally of the frame when the bucket is positioned within the retaining ring; and
    an elongated handle having two ends, one end of the handle being attached to the frame adjacent one side thereof so that the other end of the handle extends generally upwardly therefrom in a substantially vertical condition, and
    wherein each wheel assembly includes a wheel and internal bearings by which the wheel rotates relative to the remainder of the wheel assembly and further includes a cover which covers the internal bearings of the wheel assembly to protect the internal bearings from paint or other substance dropped upon the wheel assembly, and
    wherein the handle includes nesting means disposed adjacent the upper end of the handle within which an extension of a paint roller can be leaned when the paint roller, with extension attached, is positioned within a bucket and the bucket is, in turn, positioned within the retaining ring so that the extension is prevented from shifting from side-to-side with respect to the handle of the dolly.

2. The dolly as defined in claim 1 wherein the wheel assemblies are disposed outboard of the retaining ring by at least about 2.5 inches to enhance the stability of the dolly.

3. The dolly as defined in claim 1 wherein the wheel assemblies include double-wheeled casters having wheels which are capable of orienting themselves in the direction of movement of the dolly across the support surface.

4. The dolly as defined in claim 1 wherein the handle includes means defining a hook adjacent the upper end of the handle about which a handle of a bucket can be hooked.

5. The dolly. as defined in claim 4 wherein the hook-defining means includes a hook portion having an upper portion which extends generally upwardly.

6. The dolly as defined in claim 1 wherein the nesting means includes a U-shaped member which is attached to the remainder of the handle of the dolly so that when the extension to which a paint roller is attached is leaned against the handle of the dolly, the legs of the U-shaped member are disposed on opposite sides of the extension.

7. The dolly as defined in claim 1 includes at least eight wheel assemblies which are attached to the frame so as to be regularly spaced about the retaining ring.

8. The dolly as defined in claim 1 wherein the wheel assemblies are disposed outboard of the center of the spoke-like arrangement of the frame by at least about 8.0 inches to enhance the stability of the dolly.

9. The dolly as defined in claim 1 wherein the handle is attached to one side of the frame and the frame includes a brace member on the side thereof adjacent the handle so that a foot can be positioned against the brace member for bracing the frame as the handle is used as a lever to maneuver the opposite side of the frame to a higher level.

10. A dolly facilitating the transport of a bucket between two sites, the dolly comprising:

a wheeled base including
   a) a frame having a plurality of elongated members having at least eight end portions and which are joined together in a planar, spoke-like arrangement so that the end portions of the elongated members are directed generally outwardly from a center,
   b) at least eight wheel assemblies which are pivotally attached to the end portions of the elongated members for supporting the spoke-like arrangement of the frame in a substantially horizontally-disposed orientation for wheeled movement of the base across a supporting surface and wherein the wheel assemblies include double-wheeled casters, and
   c) a retaining ring which is supported upon the spoke-like arrangement of the frame for accepting a bucket inserted bottom-end first therein so that when the bucket is positioned bottom-end first into the retaining ring so as to rest upon the spoke-like arrangement of the elongated members, the retaining ring prevents an appreciable shift of the bucket across the spoke-like arrangement; and an elongated handle having two opposite ends, one end of the handle being attached to the frame adjacent one side of the retaining ring so that the other end of the handle extends generally upwardly from the frame in a substantially vertical condition, and wherein the handle. of the dolly includes attachment means disposed adjacent the other end of the handle to which the handle of another bucket can be attached, and wherein the handle includes nesting means disposed adjacent the other end of the handle within which an extension of a paint roller can be leaned when the paint roller, with extension attached, is positioned within a bucket and the bucket is, in turn, positioned within the retaining ring so that the extension is prevented from shifting from side-to-side with respect to the handle of the dolly.

11. The dolly as defined in claim 10 wherein the wheel assemblies are disposed outboard of the retaining ring by at least about 2.5 inches to enhance the stability of the dolly.

12. The dolly as defined in claim 10 wherein the attachment means includes a hook assembly disposed adjacent the upper end of the handle about which a handle of a bucket can be hooked.

13. The dolly as defined in claim 12 wherein the hook assembly includes a hook portion having an upper portion which extends generally upwardly.

14. The dolly as defined in claim 10 wherein the nesting means includes a U-shaped member which is attached to the remainder of the handle of the dolly so that when the extension to which a paint roller is attached is leaned against the handle of the dolly, the legs of the U-shaped member are disposed on opposite sides of the extension.

15. The dolly as defined in claim 10 wherein each wheel assembly includes a pair of wheels and internal bearings by which the wheels are permitted to rotate relative to the remainder of the wheel assembly and further includes a cover which covers the internal bearings of the wheel assembly to protect the internal bearings from paint or other substance dropped upon the wheel assemblies from above.

16. The dolly as defined in claim 10 in combination with a bucket which is positioned within the retaining ring of the dolly.

17. The dolly as defined in claim 10 wherein the eight wheel assemblies are attached to the frame so as to be regularly spaced about the retaining ring.

18. The dolly as defined in claim 10 wherein the handle is attached to one side of the frame and the frame includes a brace member on the side thereof adjacent the handle so that a foot can be positioned against the brace member for bracing the frame as the handle is used as a lever to maneuver the opposite side of the frame to a higher level.

* * * * *